Jan. 13, 1970  D. N. COBLEY  3,489,402
COMPOSITE ELASTOMERIC SPRINGS
Filed Aug. 17, 1967
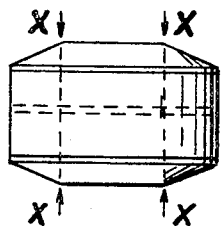
Fig.1(a).
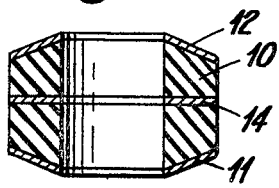
Fig.1(b).
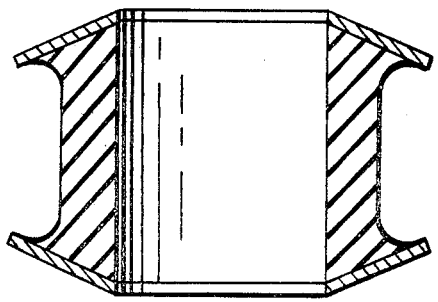
Fig.6.
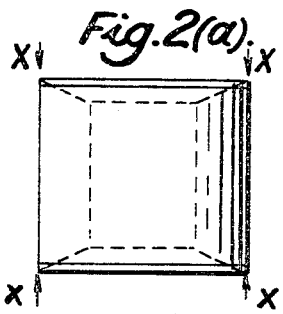
Fig.2(a). Fig.2(b).
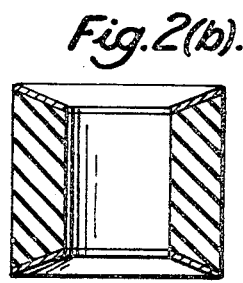
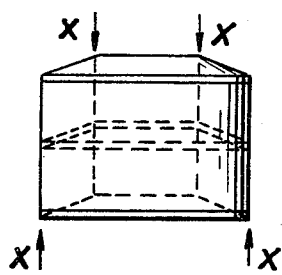
Fig.3(a). Fig.3(b).
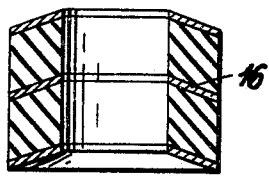
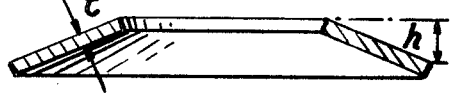
Fig.7.
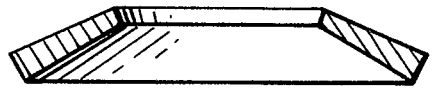
Fig.8.
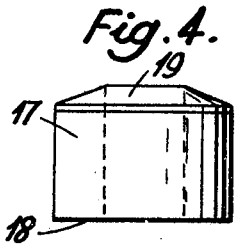
Fig.4.
Fig.5.
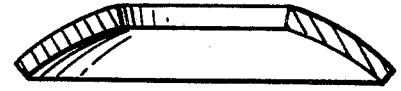
Fig.9.
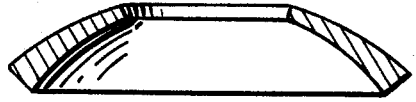
Fig.10.

3,489,402
COMPOSITE ELASTOMERIC SPRINGS
David Noel Cobley, London, England, assignor to BTR Industries Limited, London, England, a British company
Filed Aug. 17, 1967, Ser. No. 661,252
Claims priority, application Great Britain, Aug. 22, 1966, 37,560/66
Int. Cl. F16f 1/32, 1/36
U.S. Cl. 267—1                                                                14 Claims

ABSTRACT OF THE DISCLOSURE

A composite spring consisting of a block of elastomeric material having two opposed faces, a dished plate of flexible resilient material attached to or seating on one of the faces and means to apply a compressive force between the plate and the other face whereby the force is applied at least initially to a limited area of the plate such that the plate tends to be flattened in addition to compression of the block.

---

The invention relates to composite springs and provides a composite spring comprising a block of elastomeric material having two opposed faces, a dished plate of flexible resilient material attached to or seating on one of the faces and means to apply a compressive force between the plate and the other face whereby the force is applied at least initially to a limited area of the plate such that the plate tends to be flattened in addition to compression of the block.

Preferably the said one face is dished in the same sense as the plate. The arrangement of the plate may be such that the concave or the convex side of the plate faces towards the block.

There may be a second dished plate of flexible resilient material attached to or seating on the other of the faces in which case the force applying means is, or may be, arranged to apply a compressive force between the two plates such that both plates tend to be flattened.

The block is preferably bonded to the plate or plates.

The plate or plates may be in the form of a dished washer in which case the block preferably has a hole corresponding to the hole in the washer.

It is also preferred that the block has the same transverse cross-section as the shape of the plate although the cross-section of the block may be altered in planes spaced from the plate.

In the case where there are two plates, the convex or concave sides of the plates may face towards one another or the concave sides of both plates may face in the same direction.

The plate may have a constant or a tapering thickness (e.g. tapering away from the centre of the plate).

The plate may be made of metal, or of a polymeric material such as a filled or unfilled thermoplastic or thermosetting material, or a hard rubber compound.

The block may be split into two or more portions by one or more intermediate plates attached to a seating between the portions. The intermediate plate may be dished in either sense. In this way a desired spring performance may be achieved.

Some specific forms of composite springs according to the invention will not be described with reference to the accompanying drawings, in which:

FIGURES 1a and 1b, 2a and 2b, 3a and 3b are side elevations and sections through three different springs respectively;

FIGURE 4 is a side elevation of a fourth spring;

FIGURE 5 is a side elevation of a fifth spring;

FIGURE 6 is a cross-section through a sixth spring; and

FIGURES 7 to 10 are cross-sections through four alternative washers.

FIGURES 1a and 1b show a first spring comprising a sleeve 10 of rubber and two metal washers 11, 12 bonded to opposed faces of the sleeve which faces have the same configurations as the washers. The washers 11, 12 have their concave sides facing towards one another.

The sleeve 10 is split into two portions transversely of the spring and an intermediate metal plate 14 is bonded to the two portions as shown.

As can be seen from FIGURE 1a compressive forces X would be applied to the spring at the inner peripheries of the washers 11, 12 whereby to tend to flatten the washers as well as loading the sleeve 10.

FIGURES 2a and 2b show an embodiment where the washers have their convex sides facing towards one another and in this case a compressive force would be applied to the outer peripheries of the washers.

FIGURES 3a and 3b show an embodiment where the washers are dished in the same direction in which case compressive forces are applied to the inner periphery of the upper washer and the outer periphery of the lower washer.

There is an intermediate washer 16 which is dished in the same direction as the end washers.

FIGURE 4 shows an embodiment where a sleeve 17 has a flat end face 18 at its lower end and a dished end face at its upper end to which is bonded a dished washer 19.

FIGURE 5 shows a sleeve 20 to which is bonded a flat washer 21 and a dished washer 22.

FIGURE 6 shows an embodiment similar to FIGURE 1 except that the intermediate washer is omitted and the outer diameter of the sleeve is less than the outer diameter of the washers except in the locality of the washers.

FIGURES 7 to 10 show different configurations of washers which may be used in any of the previous embodiments. FIGURE 7 shows a dished washer with a constant thickness and with a straight cross-section, FIGURE 8 shows a dished washer with a tapering thickness and a straight cross-section and FIGURES 9 and 10 show dished washers with a curved cross-section and which taper in opposite directions respectively.

The composite springs described are all designed to combine the properties of rubber springs (e.g. high energy storage capacity, vibration damping properties) with the wide range of load-deflection characteristics obtainable with coned disc types of spring. In particular the composite springs may be constructed so as to have a zero, or very low, spring rate over part of their allowable deflection range.

Advantages of the composite springs over coned disc springs are:

(1) The dished washers can readily be deflected through to the flat position, so that load-deflection properties can be fully exploited.

(2) Stacking and alignment problems are reduced.

(3) Corrosion problems are reduced.

(4) Metal to metal contact, and hence friction effects, are reduced.

(5) Greater design flexibility exists, e.g. for the spring of FIGURE 1, a spring having a zero rate can be obtained for any value of $h/t > \sqrt{2}$ where $h$ and $t$ are the dimensions indicated in FIGURE 7. For a coned disc, $h/t = \sqrt{2}$ is the only theoretical value to give this feature.

I claim:

1. A composite spring comprising a dished plate of flexible resilient material and a block of elastomer having two opposed faces at least one of which is complementary in shape to said plate with the latter seated on said block so that a compressive force applied between said plate and the other face of said block is exerted initially on a limited area of the plate thereby tending to cause flattening of the plate and block, said plate having the peripheral portion thereof of different thickness than the central portion to provide a gradation of resistance to the compressive force.

2. A composite spring as defined in claim 1 in which the plate has a convex outer face.

3. A composite spring as defined in claim 1 in which the plate has a concave outer face.

4. A composite spring as defined in claim 1 in which the block is bonded to the plate.

5. A composite spring as defined in claim 1 in which the plate tapers in thickness from the center of the plate to the periphery.

6. A composite spring as defined in claim 1 in which the plate tapers in thickness from the periphery towards the center.

7. A composite spring as defined in claim 1 in which there is a second dished plate of flexible resilient material seated on the said other face of said block of elastomer whereby the compressive force exerted upon the spring tends to cause both plates to be flattened.

8. A composite spring as defined in claim 7 in which both of the said plates have convex configurations faced towards one another.

9. A composite spring as defined in claim 7 in which both of said plates have concave configurations faced towards one another.

10. A composite spring as defined in claim 7 in which the outer surface of one of said plates is convex and the other surface of the other of said plates is concave.

11. A complex spring as defined in claim 1 in which the plate is in the form of a dished washer.

12. A composite spring as defined in claim 11 in which the block has a hole therethrough corresponding to the hole in the washer.

13. A composite spring as defined in claim 1 in which the block is divided into at least two portions by at least one plate intermediate the said two faces with the said intermediate plate attached to complementary shaped surfaces on the adjacent portions of the block.

14. A composite spring as defined in claim 13 in which the intermediate plate is dished.

References Cited

UNITED STATES PATENTS

| | | |
|---|---|---|
| 2,726,080 | 12/1955 | Withall. |
| 3,083,065 | 3/1963 | Hinks et al. ____ 267—57.1 XR |
| 3,134,585 | 5/1964 | Trask. |
| 3,159,249 | 12/1964 | Lazan. |
| 3,279,779 | 10/1966 | Thomas et al. |

DRAYTON E. HOFFMAN, Primary Examiner

H. BELTRAN, Assistant Examiner

U.S. Cl. X.R.

267—57.1